E. R. HOOKER AND E. C. KAUSRUD.
AUTOMATIC TIRE GAGE.
APPLICATION FILED MAY 27, 1920.

1,377,582.

Patented May 10, 1921.

INVENTORS
E. R. Hooker
E. C. Kausrud
BY
Hazard & Miller
ATTORNEYS

UNITED STATES PATENT OFFICE.

EDWIN R. HOOKER AND ERIC C. KAUSRUD, OF LOS ANGELES, CALIFORNIA.

AUTOMATIC TIRE-GAGE.

1,377,582.  Specification of Letters Patent.  Patented May 10, 1921.

Application filed May 27, 1920. Serial No. 384,780.

*To all whom it may concern:*

Be it known that we, EDWIN R. HOOKER and ERIC C. KAUSRUD, citizens of the United States, residing at Los Angeles, in the county of Los Angeles and State of California, have invented new and useful Improvements in Automatic Tire-Gages, of which the following is a specification.

This invention is an automatic tire gage employed in connection with a usual filling valve upon the end of an air line and particularly adapted to engage the usual valve stem of a pneumatic tire for filling the tire.

It is the object of the invention to provide an improved gage which may be adjusted to any desired pressure and which is so arranged that when the desired pressure is reached in the tire the filling valve will be opened to the atmosphere and an audible signal be given thereby calling attention to the fact that the tire has been filled to the desired pressure and also preventing the further entrance of air into the tire.

The invention will be readily understood from the following description of the accompanying drawings, in which—

Figure 1:
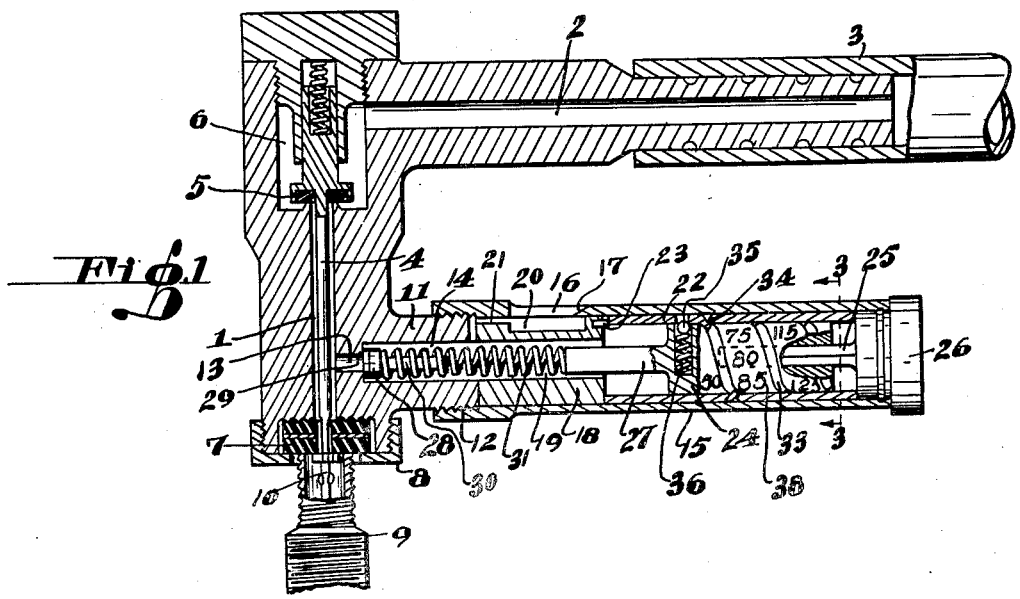
Figure 1 is a longitudinal section through a pressure gage constructed in accordance with the invention and connected with a usual filling valve.
Figure 2:
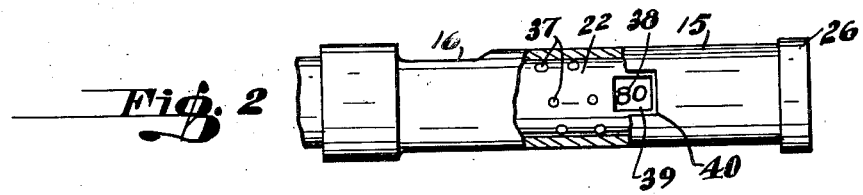
Fig. 2 is a side elevation of the pressure gage partly broken away.
Figure 3:
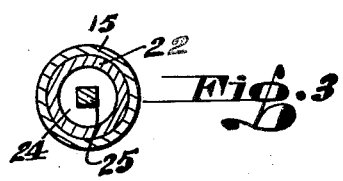
Fig. 3 is a transverse section on the line 3—3 of Fig. 1.

The filling valve in connection with which the improved pressure gage is employed may comprise a usual conduit 1 having the laterally extending conduit 2 connected with a usual air line 3. A valve stem 4 extends through conduit 1, this valve stem being connected with a normally closed valve 5 in the valve chamber 6 connecting conduits 1 and 2. The end of conduit 1 is provided with usual packing rings 7 and the usual retaining cap 8. The valve stem 4 projects outwardly beyond the end of the conduit and is arranged, when the end of the conduit is forced down over the valve stem 9 of a pneumatic tire, to abut against the valve rod 10 within said stem for unseating the valve within the valve stem of the tire and also unseating valve 5 to permit the passage of air from the air line through conduit 2 and valve chamber 6 to conduit 1 and thence into the tire.

The conduit 1 is shown as provided with a laterally extending nipple 11 to which the improved pressure gage may be attached as by the threaded connection 12. The nipple 11 is provided with a conduit 13 communicating with conduit 1 and terminating in a valve chamber 14 at the outer end of the nipple.

The pressure gage is shown as comprising an outer casing 15 adapted to be threaded on to the nipple 11. An opening 16 is provided in this casing, preferably, adjacent the threaded end thereof which connects with the nipple 11. One end of this opening is provided with a lip 17 arranged to form a whistle. A plug 18 is received within the casing 15, this plug being provided with a central opening 19 in alinement with valve chamber 14 extending through the nipple 11. The plug 18 is provided with a peripheral recess 20 at the opening 16 in the outer casing and this peripheral recess is connected by a passage 21 with the valve chamber 14. A tube 22 is received within casing 15 between the end of plug 18 and the outer end of the pressure gage, this tube being held against rotation relative to the outer casing by a pin 23 connecting said tube and the plug 18. The plug 18 is in turn held against rotation relative to the casing 15 in any suitable manner.

A cylinder 24 is rotatable within tube 22, this cylinder being provided at its outer end with an axial operating rod 25 having a head 26 at its outer end received over the end of casing 15. The opposite end of cylinder 24 is provided with an axially projecting pin 27 extending within the opening 19.

A valve head 28 is arranged in the valve chamber 14 so as to seat upon a valve seat 29 provided at the junction of conduit 13 with valve chamber 14. This valve head is provided with a valve stem 30 extending longitudinally of the valve chamber 14. A spring 31 shown as a coil spring extends through the alined openings 14 and 19 and abuts at one end against the end of pin 27 and is received at its other end around the valve stem 30 so as to abut against the valve head 28. By this arrangement the valve head is yieldably urged against the valve seat by the tension of spring 31, the tension of this spring being adjustable by longitudinal movement of cylinder 24 lengthwise of the tube 22.

By this arrangement it will be seen that when the valve head 28 is in its normal closed position the escape of air through conduit 13 is prevented; but when the desired pressure has been reached within the tire being filled so that the pressure within conduit 1 and conduit 13 overcomes the tension of the valve and the latter opens, the air within conduit 13 is allowed to escape past the valve through valve chamber 14 and through passage 21 to the recess 20 from whence it will escape through opening 16 past the lip 17. The escaping air will thus sound the whistle formed by lip 17 to call attention to the fact that the desired pressure has been obtained within the tire being filled.

The means employed for adjusting cylinder 24 longitudinally within tube 22 to vary the tension of spring 31 so as to cause valve 28 to open at any predetermined pressure may include a spiral groove 33 formed in the outer surface of said cylinder, this spiral groove being arranged to be engaged by suitable notches 34 formed in the inner surface of tube 22. By this arrangement rotation of cylinder 24 by means of cap 26 will cause longitudinal movement of said cylinder along tube 22. The cylinder may be held in adjusted positions lengthwise of tube 22 by the retaining means shown as comprising a ball 35 yieldably urged outwardly as by a spring 36 beyond the surface of the cylinder and arranged to engage in any one of a series of apertures 37 provided in tube 22. The surface of cylinder 24 may be suitably graduated as by the numerals shown at 38 which are arranged to denote various pressures.

An opening 39 extends through the tube 22 in alinement with an opening 40 provided in the outer casing 15, and the numerals upon cylinder 24 are so arranged as to successively appear beneath said openings as the cylinder is moved along the tube 22, it being understood that the retaining means for the cylinder and the graduations thereon are so arranged relative to one another and to the openings 39 and 40 that the movement of the cylinder along the tube will so adjust the tension of spring 31 as to cause the tension of said spring to be overcome by a pressure corresponding to the number appearing at the openings 39 and 40.

It will be observed that the construction as thus provided forms ready means for accurately adjusting the tension of spring 31 so that the latter will be overcome at any predetermined pressure for permitting escape of air through conduit 13 and sounding an audible signal.

Various changes may be made without departing from the spirit of the invention as claimed.

What is claimed is:

1. The combination with a filling valve, of a pressure gage comprising a casing, a passage leading from said filling valve to said casing, a valve for closing said passage, an opening communicating with said passage beyond said valve, means for yieldably closing said valve, a rotatable member engaging said yieldable closing means for adjusting the tension of the same, and means for longitudinally adjusting said rotatable member by rotating the same, said casing having an opening therethrough and graduations upon said rotatable member arranged to successively appear beneath said opening when said rotatable member is rotated to denote the adjustment of said gage.

2. The combination with a filling valve, of a pressure gage comprising a casing, a passage connecting said filling valve and said casing, a valve for closing said passage, means for yieldably urging said valve into closed position, a member rotatable within said casing, coöperating means between said casing and said rotatable member whereby rotation of said member will shift the latter lengthwise of said casing, said member engaging said yieldable urging means for adjusting the tension thereof, and a retaining protuberance projecting from said rotatable member and having a spring support for the same within said rotatable member, said casing having a recess adapted to receive said protuberance for forming means for yieldably holding the rotatable member in adjusted positions.

3. The combination with a filling valve, of a pressure gage comprising a casing, a passage connecting said filling valve and said casing, a valve for closing said passage, means for yieldably urging said valve into closed position, a member rotatable within said casing, coöperating means between said casing and said rotatable member whereby rotation of said member will shift the latter lengthwise of said casing, said member engaging said yieldable urging means for adjusting the tension thereof, said casing having an opening therethrough and graduations upon said rotatable member arranged to successively appear beneath said opening when said member is rotated to denote the adjustment of said gage, and yieldable retaining means for holding the rotatable member in adjusted positions.

4. The combination with a filling valve, of a pressure gage comprising a casing, a passage connecting said filling valve and said casing, a valve for closing said passage, means for yieldably urging said valve into closed position, means for adjusting said yieldable means, comprising a cylinder rotatable within said casing and having a spiral groove therein, means upon the inner surface of said casing for engaging said spiral groove, means for rotating said cylinder to shift the latter lengthwise of said casing, said cylinder engaging said yieldable urging means for adjusting the tension thereof, an opening extending through said casing, and graduations upon said cylinder arranged to successively appear beneath said opening and adapted to denote the tension to which said yieldable urging means is adjusted.

In testimony whereof we have signed our names to this specification.

EDWIN R. HOOKER.
ERIC C. KAUSRUD.